July 31, 1951 — W. E. FORD — 2,562,264
TREAD FOR CRAWLER MODELS
Filed March 14, 1949
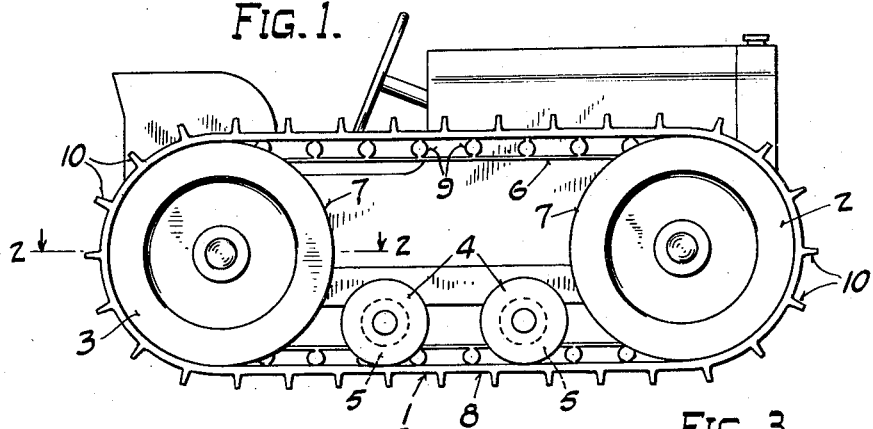
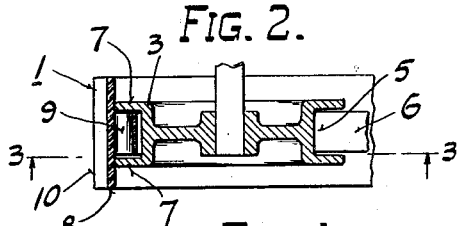
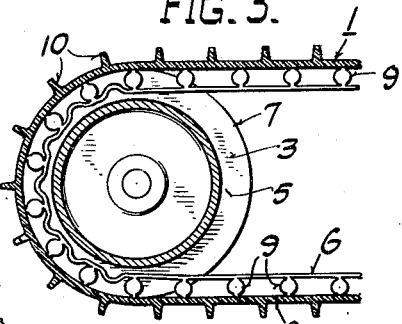
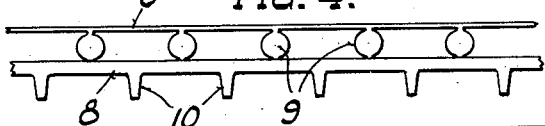
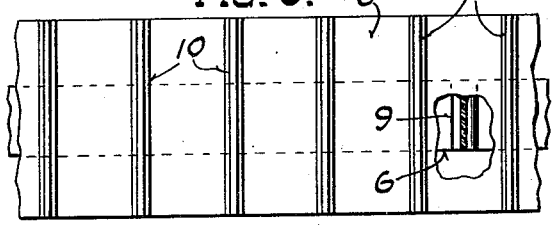
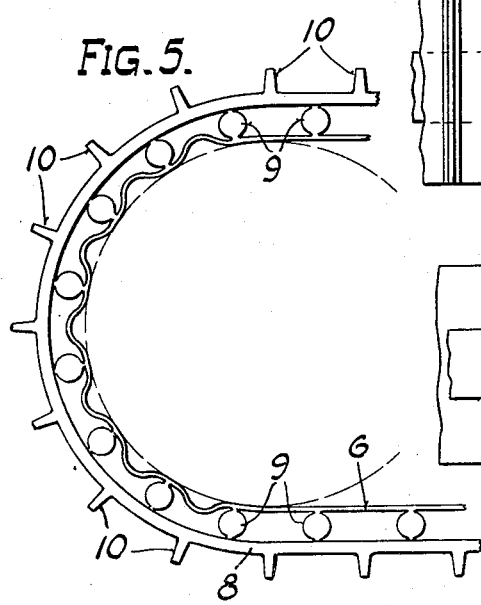
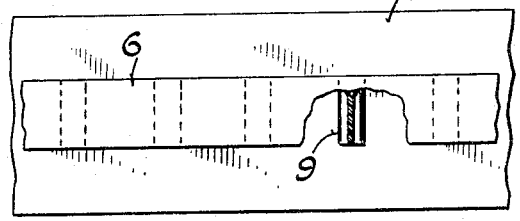
INVENTOR.
William E. Ford
BY *Andrus & Sceales*
ATTORNEYS.

Patented July 31, 1951

2,562,264

UNITED STATES PATENT OFFICE 2,562,264

TREAD FOR CRAWLER MODELS

William E. Ford, Milwaukee, Wis., assignor to Product Miniature Company, Milwaukee, Wis., a corporation of Wisconsin Application March 14, 1949, Serial No. 81,337

6 Claims. (Cl. 305—10)

This invention relates to a tread for crawler models, and more particularly to endless treads applicable to small models of crawler tractors, trucks, tanks and the like.

One of the objects of the invention is to provide an endless flexible tread which will more nearly simulate a jointed crawler tread of the prototype machine.

Another object of the invention is to provide a tread which is of longer life and which has less friction and wear in operation.

Another object is to provide a centering means for the tread that will fold when passing over the end wheels and reduce internal stresses therein.

Another object is to provide a tread which can be manufactured by less costly methods and preferably by injection molding whereby all joints are eliminated and a single piece tread is produced without mold flash.

Another object is to construct the tread of a synthetic resin simulating rubber and which avoids the costly and time consuming problems of vulcanization.

Other objects and advantages will appear hereinafter.

According to the invention in one of its aspects the endless tread is in a thin flat belt form with a thinner centering belt of substantially less width spaced inwardly from the inner surface thereof by a plurality of spaced connections which provide for the folding of the inner belt webs into the spaces between the connections as the tread passes around grooved retaining wheels. The connections referred to may be and preferably are small round cylinders extending transversely of the tread with the inner and outer belts substantially tangential thereto. The outer belt may have any suitable outer non-skid tread surface and preferably has a series of spaced transverse ridges or ribs simulating cleats or grousers in larger crawler treads. The tread is designed to have the sides of the grooved guide wheels engage the back or inner surface of the outer belt and to have the inner centering belt and its connections lie freely in the groove of the wheels whereby the centering portion of the belt is substantially free of stress and the outer tread surface is kept tight and true to its course at all times.

According to the invention in a second aspect thereof, the endless tread is produced by a die molding process from synthetic resin material which simulates natural rubber. The tread is molded in one piece free of any fastening transverse joints of the character generally required in former tread manufacture. The construction of the tread in thin sections throughout and avoiding all thick sections provides a high amount of flexibility for all parts of the tread so that rigidity is not encountered to interfere with the proper working of the tread. The synthetic resin found most suitable at the present time for manufacturing the tread is vinyl chloride-acetate, which has the general flexibility of rubber in sections under about one sixteenth of an inch in thickness.

The invention is illustrated in the accompanying drawing in which:

Figure 1 is a side elevation of a crawler model showing the tread applied to the same;

Fig. 2 is a transverse axial horizontal section through one of the end wheels and the tread supported thereby, taken on line 2—2 of Fig. 1;

Fig. 3 is a section taken at right angles to Fig. 2 on line 3—3 thereof;

Fig. 4 is an enlarged detail side elevation of the tread shown in a straight path;

Fig. 5 is a view similar to Fig. 4 showing the tread in a curved path as on the circumference of a wheel;

Fig. 6 is an enlarged plan view of the outer tread surface with parts broken away to show the centering web and connections; and Fig. 7 is an enlarged plan view of the inner surface of the tread showing the centering web and with parts broken away to show the connections.

The crawler model illustrated is of a tractor in which each side of the tractor is supported on an endless tread I extending longitudinally of the tractor and around a forward wheel 2 and a rear drive wheel 3 of the tractor. Suitable smaller wheels 4 may be provided between wheels 2 and 3 to bear against the lower traction portion of the tread for the purpose of making it hug the ground.

Each of the wheels 2, 3 and 4 are grooved to provide a rectangular recess 5 in the rim thereof, as shown in the drawing, for the purpose of receiving the centering web 6 of the tread. The outer flanges 7 of the wheels, defining the opposite sides of the groove, bear against the underside of the tread belt 8 of tread I to carry the tread in its movement and support the tractor thereon.

The tread I is constructed of an outer belt 8 and the inner centering belt web 6, referred to previously, and which are disposed in spaced relation as shown. The connections between belts 6 and 8 comprise a plurality of spaced connectors 9 which preferably have the shape of small cylinders extending transversely of the tread and which are spaced apart a sufficient distance to provide plenty of space for belt web 6 to fold in between adjacent connectors as the tread passes over a wheel, as shown in Fig. 3.

The inner belt web 6 and connectors 9 do not extend for the full width of the outer belt 8, and are disposed centrally thereof to leave a smooth inner surface for belt 8 on each side to bear against the corresponding flanges 7 of the wheels as the tread passes over the wheels in operation.

The inner belt 6 and outer belt 8 are disposed nearly tangential to cylindrical connectors 9 and thereby provide for a certain freedom of the connectors to roll relative to either or both belts during operation of the tread.

The thin inner belt web 6 joins the connectors 9 and ties them together so that they enter the grooves 5 in the wheels without any possibility of offset, and prevents distortion of the connectors that might otherwise tear or break them from the outer belt 8.

The ends of connectors 9 are preferably perpendicular to the belts 6 and 8 so that the centering members 6 and 9 are of the same width throughout and there is no binding between the same and the wheels.

The outer tread surface of the belt 8 may be made up in any suitable design, that illustrated being a series of spaced transverse ribs 10 extending for the full width of the belt 8. The ribs 10 simulate grousers in larger crawler tracks.

By providing equal spacing between connectors 9 and between ribs 10 so that the tread 1 contains the same number of each, the tread is made to more accurately simulate a larger crawler track. The connectors 9 simulate pivotal connections between joints and should be positioned preferably intermediate the ribs 10, as shown.

The tread 1 described is injection molded in suitable circular dies which provide for the molding of all parts integrally with each other and without joints. Heretofore all treads, so far as known by the present inventor, have been manufactured in continuous lengths of flat strip which had to be cut to length and then joined to provide the endless tread desired. The present invention makes it possible to eliminate the undesirable tread joint heretofore so necessary.

The tread 1 is constructed of a synthetic resin such as vinyl chloride-acetate which is generally black and simulates the appearance and resilience of rubber when formed in relatively thin sections, as shown. By utilizing vinyl chloride-acetate, the former costly vulcanization step can be eliminated and the injection molding is made possible. The tread can be produced in a few seconds time so that a single set of dies can produce a large number of treads in a day with much less costly apparatus than that required for a corresponding production of rubber treads.

The invention may have various embodiments within the scope of the accompanying claims.

I claim:

1. An endless track tread of the class described molded integrally in a single piece and comprising an outer tread belt having a tread surface, an inner centering thin flexible belt spaced inwardly thereof, and cylindrically shaped transverse spaced connectors disposed between said belts and with said belts substantially tangential thereto to provide a limited rolling of the connectors relative to the belts.

2. An endless track tread of the class described molded integrally in a single piece and comprising an outer tread belt having a tread surface of substantial width, an inwardly centering thin flexible belt spaced inwardly thereof and of substantially less width than said outer tread belt and centered in width with respect thereto, and spaced connectors between the inner and outer belts, said outer belt being adapted to ride upon wheel rims on opposite sides of said narrower inner belt to support the tread, and said inner belt and connectors being adapted to ride in a space between the wheel rims without tensioning the outer belt.

3. An endless track tread of the class described molded integrally in a single piece and comprising a belt having a tread surface of substantial width, a plurality of longitudinally spaced centering members projecting inwardly therefrom and of substantially less width than the width of said belt and centered in width with respect thereto, and thin flexible webs joining the inner edges of said inwardly projecting members, said belt being adapted to ride upon wheel rims on opposite sides of said members to support the tread, and said members and webs being adapted to ride in a space between the wheel rims without tensioning the outer belt.

4. The track tread of claim 2 devoid of transverse seams and having the inner belt of substantial thinness and flexibility to provide for application of the tread to a pair of wheels without requiring movement of the wheels toward one another.

5. The track tread of claim 2 formed of vinyl chloride-acetate with the belts thin to provide the resilience and flexibility of rubber, and with the construction adapted to avoid tensioning requiring any substantial stretching of the belts.

6. The tread of claim 2 in which the outer tread belt is of substantial thickness and resists stretching, and the inner belt is of thin webbing adapted to fold between connectors as the tread passes over a wheel.

WILLIAM E. FORD.

REFERENCES CITED

The following references are of record in the file of this patent:

UNITED STATES PATENTS

| Number | Name | Date |
|---|---|---|
| 1,820,882 | Engstrom | Aug. 25, 1931 |
| 1,911,546 | Berger | May 30, 1933 |

FOREIGN PATENTS

| Number | Country | Date |
|---|---|---|
| 496,878 | France | Nov. 19, 1919 |
| 637,900 | Germany | Nov. 5, 1936 |